Nov. 21, 1967   H. W. SCHAFFT   3,353,400
ULTRASONIC TRANSDUCER AND GAS ANALYZER
Original Filed June 5, 1963   2 Sheets-Sheet 1
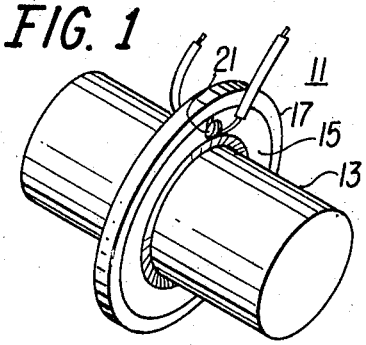
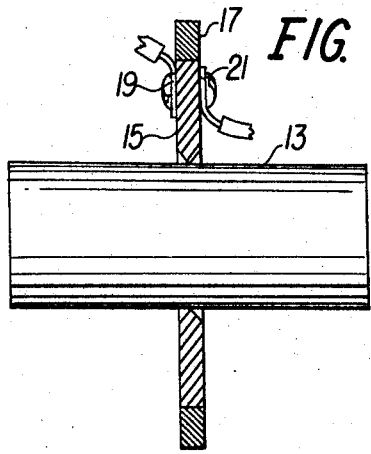
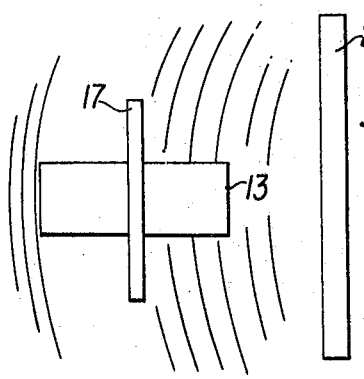
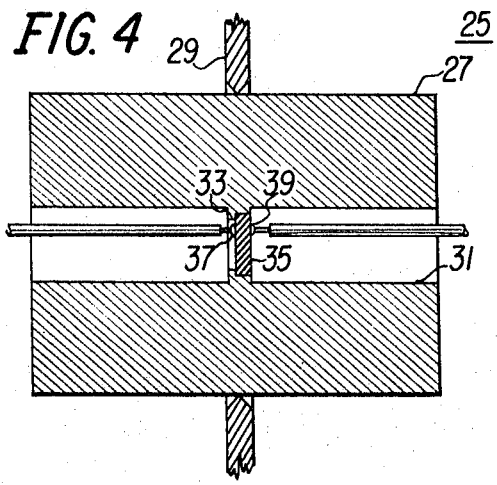
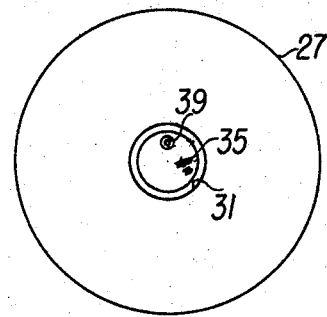
INVENTOR.
Hugo W. Schafft
BY
Mueller & Aichele
Attys.

Nov. 21, 1967   H. W. SCHAFFT   3,353,400
ULTRASONIC TRANSDUCER AND GAS ANALYZER
Original Filed June 5, 1963   2 Sheets-Sheet 2
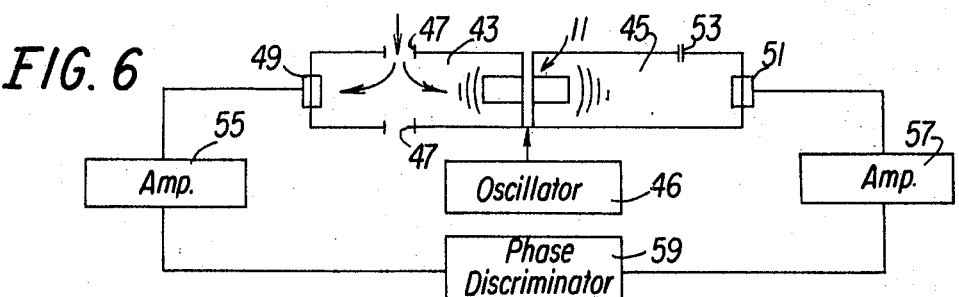
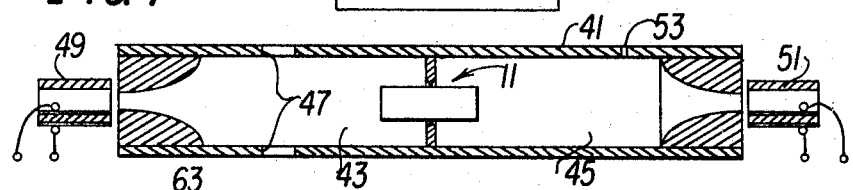
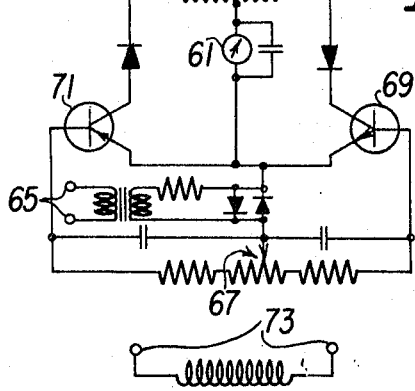
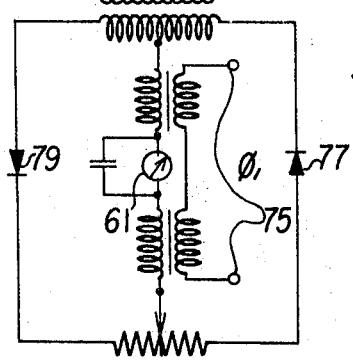
INVENTOR.
Hugo W. Schafft
BY
Mueller & Aichele
Attys.

3,353,400
ULTRASONIC TRANSDUCER AND
GAS ANALYZER
Hugo W. Schafft, Des Plaines, Ill., assignor to Motorola, Inc., Franklin Park, Ill., a corporation of Illinois
Continuation of application Ser. No. 285,690, June 5, 1963. This application Mar. 21, 1966, Ser. No. 536,153
2 Claims. (Cl. 73—24)

This application is a continuation of application Ser. No. 285,690, filed June 5, 1963 for Ultrasonic Transducer and Gas Analyzer, now abandoned.

This invention relates to electromechanical transducers and more particularly to an improved ultrasonic transducer and to a gas detector device incorporating such transducer.

Transducers which utilize an alternating current voltage to produce compressional vibrations in a gaseous medium present numerous problems for effective operation. This is especially true when utilized in lighter gases such as air, wherein impedance matching is very difficult to attain. Ideally, the transducer should drive the air similarly to the operation of a piston, but such a driving effect is difficult to achieve at ultrasonic frequencies. One of the more effective uses of transducers of this type is in a device for detecting and identifying unknown gases. Such transducers are used in many other applications, such as in connection with ultrasonic radar systems, alarm systems, and in long distance ultrasonic remote control units. Other uses for transducers of this type include the atomization of liquids, as insect repellers, and as air cleaners.

By utilizing such a device in a gas detector, compressional waves might be produced and their velocity measured. Difficulties arise however, since the velocity of the compressional waves could vary considerably with ambient temperature, humidity, pressure, etc.

Accordingly, it is an object of this invention to provide an improved transducer capable of unidirectional propagation.

Another object of the invention is to provide an ultrasonic transducer capable of operating in a gaseous medium with improved efficiency.

Still another object of the invention is to provide an ultrasonic transducer which is simple of construction and inexpensive to manufacture.

Another object of the invention is to provide an improved gas detector utilizing compressional waves produced by the ultrasonic transducer.

Still another object of the invention is to provide a gas detector incorporating the ultrasonic transducer, which is unaffected by ambient variables such as humidity, atmospheric pressure, etc.

A feature of the invention is the provision of a transducer including a substantially cylindrical body driven into longitudinal vibration by a piezo-electric ceramic driving member engaging the body at points having a substantially circular locus disposed in a plane transverse to the body.

Another feature of the invention is the provision of a transducer including a substantially cylindrical body driven by an annular piezo-electric ceramic ring surrounding the outer diameter of the body at a nodal point of vibration thereof.

Still another feature of the invention is the provision of a transducer including a substantially cylindrical body having a cylindrical longitudinal opening therein, and the further provision of a piezo-electric ceramic disk in the opening and engaging the body at the nodal point of vibration thereof.

A further feature of the invention is the provision of a gas detector including the transducer of one of the preceding paragraphs placed between two contiguous chambers adapted respectively to receive known and unknown gases, and the further provision of pick up means equidistant from respective ends of the transducer to detect signals passing through the respective chambers and providing output signals, the phase difference of which provides an indication of the identity of the unknown gas.

Still another feature of the invention is the provision of a gas detector including the transducer of one of the preceding paragraphs placed between two contiguous chambers adapted to respectively receive known and unknown gases, and the further provision of microphones at each chamber providing an output signal of the resonant frequency of the transducer. An amplifier is provided for boosting the signals from each of said microphones, and a phase detector is also provided for producing an indication of the difference in phase of the signals passing through the known and unknown gases.

In the drawings:

FIG. 1 is a perspective view of a transducer constructed in accordance with the invention;

FIG. 2 is a half section view of the transducer of FIG. 1;

FIG. 3 is a side elevation of the transducer of FIG. 1 adapted for unidirectional propagation;

FIG. 4 is a half sectional view of a further embodiment of the invention;

FIG. 5 is an end view of the transducer of FIG. 4;

FIG. 6 is a schematic diagram of a gas detector incorporating the transducer of the invention;

FIG. 7 is a half sectional view of the chamber portion of the gas detector of FIG. 6;

FIG. 8 is a schematic diagram of a phase detector used in the system of FIG. 6; and FIG. 9 is a schematic diagram of an alternative phase detector.

In accordance with the invention, a transducer is constructed having a substantially cylindrical body portion driven by a ceramic driving member at a nodal point of vibration of the body. The driving member engages the body at a plurality of points, the locus of which describes a circle disposed in a plane substantially perpendicular to the axis of the body. The driving member has piezo-electric properties and a voltage is applied thereacross to strain the driving member according to the frequency of the voltage applied. The driving member strains the body and, through Poisson coupling the body is caused to vibrate longitudinally and produce compressional vibrations in the medium in which it is disposed. In one embodiment, the driving member comprises an annular ring surrounding the outer diameter of the body. In another embodiment of the invention, the body is provided with a cylindrical bore in the axial direction at the center thereof, and a ceramic driving disk is disposed in the bore to engage the body at the nodal point of vibration.

The transducer just described is particularly suited for use in a gas detector device. The gas detector device comprises a pair of contiguous chambers, one of which is adapted to contain a known gas and the other of which is adapted to contain an unknown gas. The transducer is disposed between the two chambers to produce compressional waves therein. Microphones are placed in the chambers equidistant from the respective ends of the transducer to pick up the vibrations caused by the transducer and reconvert them to electrical energy. The signals from the microphones are then amplified and applied to a phase discriminator which produces an indication according to the difference in phase between the received signals. This indication may be calibrated empirically to provide detection of various unknown gases.

Referring now to FIGS. 1 and 2, a transducer 11 is comprised of a substantially cylindrical body 13 of which the preferred material is aluminum or aluminum alloy. Body 13 is of dimensions to be resonant at a predetermined frequency, the shorter the length of body 13 the higher the frequency at which it will be resonant. When body 13 vibrates in the longitudinal mode, that is, alternate expansion and contraction along the axis thereof at the fundamental resonance frequency, a single nodal point equidistant from the ends of body 13 will exist.

A ceramic ring 15 surrounds member 13 at the nodal point of vibration thereof and engages body 13 thereat. The plane of driving ring 15 is substantially perpendicular to the axis of body 13. A supporting ring 17 surrounds the outer periphery of ceramic ring 15 for mounting the same with a minimum of vibrational interference. Ring 17 may be constructed to apply a prestress to member 15 in order that member 15 may be driven with higher voltages without danger of damage.

A pair of electrodes 19 and 21 are attached to opposite sides of ring 15. When an alternating current voltage of the fundamental resonance frequency of body 13 is applied across electrodes 19 and 21, ceramic driving ring 15, which has piezoelectric properties, will vibrate at the applied frequency in hoop mode, that is, alternate expansion and contraction of the entire circumference of ring 15, according to the piezoelectric effect. This will alternately squeeze body 13 at the given frequency and hence place a longitudinal strain on body 13, due to Poisson coupling. As a result, body 13 will vibrate according to the applied frequency to propagate the desired compressional waves in the medium in which body 13 is disposed.

Since the ceramic ring 15 is mounted at the nodal point of the longitudinal mode, it introduces minimum damping and the body 13 is allowed to vibrate free. The only losses are the internal frictional losses of the material. The remaining damping is caused by the loading effect of the particular gas in which the device is mounted. The high Q of aluminum plus the large area of the aluminum which is exposed to the gaseous medium aids in impedance matching to the gas as it creates a piston like effect, driving against the gas. The aluminum has a high Q due to the fact that it is a single integral piece, being uninterrupted by any driving pieces cemented therein, as is prevalent in prior art devices.

Referring to FIG. 3, a method of propagating the vibrations set up by the transducer shown in FIGS. 1 and 2 is illustrated. This consists simply of placing a polished reflecting plate 23 of any material parallel to one face of body 13 at the distance of a multiple of a quarter wavelength to insure in-phase reflection.

In FIGS. 4 and 5 an alternative embodiment of the invention is shown. This embodiment applies the same basic principles as the transducer shown in FIGS. 1, 2 and 3, except for the method of driving. The body portion 27 of transducer 25 is mounted by a ring or plate 29 placed at the nodal point of vibration thereof. A longitudinal cylindrical hole 31 is formed in body 27 and includes a shoulder 33 on the interior thereof. Shoulder 33 serves to mount a ceramic piezoelectric ring 35 such that it engages the inner diameter of body 27 at the nodal point of longitudinal vibration thereof. Electrodes 37 and 39 are placed on opposite sides of disk 35 and when an alternating current voltage at the fundamental resonance frequency of bar 27 is applied thereto, disk 35 will expand and contract radially to drive bar 27 in longitudinal vibration according to Poisson coupling.

In FIGS. 6 and 7 a gas detector incorporating the transducer of the invention is shown. This device utilizes the difference in velocity of propagation between various gases and senses the difference between a known gas mixture and an unknown gas mixture. The detector includes a detection chamber 41 which may be an elongated tube. Transducer 11 is placed at the exact center of chamber 41 to form two contiguous subchambers 43 and 45. Openings 47 are provided in subchamber 43 for inlet and outlet of the gas to be detected. A pair of microphones are placed at opposite ends of chamber 41 and may consist of a simple piezoelectric transducer 49 and 51 respectively. Transducers 49 and 51 convert the compressional vibrations set up in subchambers 43 and 45 by the vibration of transducer 11 into electrical signals of the same frequency.

It will be apparent that as transducer 11 vibrates due to electrical driving voltages from oscillator 46, and propagates compressional waves through subchambers 43 and 45, the gas in the chambers will determine the velocity of propagation of the compressional waves. If the path length between transducer 11 and microphones 49 and 51 are equal, their phase may be compared in a phase detector to determine the difference in the propagation qualities of the two gases in subchambers 43 and 45 respectively. The sensitivity of such a system will increase with path length and frequency. An opening 53 may be provided into subchamber 45 in order to equalize pressure, humidity and temperature between the known gas and the gas to be sensed.

The output of microphones 49 and 51 is applied to amplifiers 55 and 57 respectively, and the output of amplifiers 55 and 57 is applied to a phase discriminator 59. Discriminator 59 senses the difference in phase between the two signals applied thereto and will serve to deflect the needle of meter 61 according to the sensed polarity and amplitude of the phase difference. Accordingly, the needle of meter 61 will be deflected to the left or the right a distance commensurate with the difference in phase between the signals from amplifiers 55 and 57. If air is used as the known gas in chamber 45, it will be seen from the following table of the relative velocities of various gases with respect to air that an unknown gas may be readily identified through use of the above described device. Where the velocity of compressional waves through air is 331 meters per second, by using this value as the zero point of calibration the following gases may be readily identified as follows:

| Gas | |
|---|---|
| Argon | −12 |
| Chlorine | −65 |
| Helium | +634 |
| Hydrogen | +954 |
| Methane | +99 |
| Neon | +104 |
| Carbon dioxide | −72 |
| Carbon monoxide | +7 |
| Ethane | −23 |
| Ethylene | −14 |
| Hydrogen bromide | −131 |
| Hydrogen iodide | −174 |
| Hydrogen sulphide | −42 |
| Nitrogen | +2 to +4 |
| Oxygen | −15 |

Referring to FIG. 6, therefore, when the gas in subchamber 45 is air, the needle of meter 61 will swing to the left to indicate the presence of carbon dioxide, argon, chlorine, ethane, oxygen, ethylene, hydrogen bromide, hydrogen iodide, and hydrogen sulphide. When the meter needle swings to the right, on the other hand, it will indicate the presence of methane, hydrogen, helium, neon, carbon monoxide, and nitrogen.

A phase detector which may be used in connection with the gas detector is illustrated schematically in FIG. 8. The output of microphone 51 may be applied to terminals 63 and the output of microphone 49 may be applied to terminals 65. When potentiometer 67 is properly adjusted to balance the system, NPN transistor 69 and PNP transistor 71 will alternately conduct. If the phase of the signal applied across terminal 63 is equal to the phase applied to terminal 65, no indication will result on meter 61. On the other hand, if the signals are out of phase, a current will flow through meter 61 to deflect the same, and it will be seen that the polarity of the current therethrough will be according to the phase difference between the applied signals.

Referring now to FIG. 9 an alternative phase detector, which may be used with the gas detector, is shown. In this phase detector, the signals from microphone 51 are applied to terminals 75 and the signals from microphone 49 are applied to terminals 73. The applied signals will alternately bias diodes 77 and 79 and if a phase difference exists, a proportional amount of current will flow through meter 61 to deflect the needle.

It may therefore be seen that the invention provides an improved transducer wherein high efficiency is maintained at a minimum cost. The transducer is simple to construct and may be used as an element in a gas detector which utilizes compressional waves from the transducer to detect the presence of gas according to a predetermined deflection schedule. Ambient variables such as humidity and atmospheric pressure have no effect on the gas detector.

I claim:

1. Apparatus for comparing an unknown gas with a gas having known properties, including in combination, means forming a chamber, transducer means comprising an elongated body having first and second ends and having dimensions to be resonant in longitudinal vibration at a predetermined output frequency and further having a nodal plane of vibration, said transducer means further including a piezoelectric driving member placed in said chamber to form first and second contiguous subchambers of selected dimensions, said first subchamber adapted for containing said gas of known properties and said second subchamber adapted for containing said unknown gas, said piezoelectric driving member engaging the nodal plane of said body transverse to the axis of longitudinal vibration so that the first and second ends of said body extend respectively into said first and second subchambers, said transducer means further including electrode means on said piezoelectric driving member adapted to apply an alternating current voltage of a given frequency thereacross for straining said driving member, first and second sensing means in said first and second subchambers respectively at given distances from said first and second ends of said body, each of said sensing means producing an alternating current voltage signal of a frequency corresponding to the signal said sensing means receives from said transducer, and phase detector means comparing the phase of said alternating current voltage signals from said first and second sensing means and providing an indication of the variance therebetween.

2. Apparatus for comparing an unknown gas with a gas having known properties, including in combination, means forming a chamber having first and second subchambers, piezoelectric transducer means mounted within said chamber intermediate said first and second subchambers and having dimensions to be resonant in longitudinal vibrations at a predetermined output frequency, said transducer means comprising an elongated body having first and second ends respectively extending into said first and second subchambers, said first subchamber adapted for containing said gas of known properties and said second subchamber adapted for containing said unknown gas, means to apply an alternating current voltage of a given frequency to said transducer means for straining the same, first and second sensing means in said first and second subchambers respectively at given distances from said first and second ends of said body, each of said sensing means producing an alternating current voltage signal of a frequency corresponding to the signal said sensing means receives from said transducer means, and phase detector means comparing the phase of said alternating current voltage signals from said first and second sensing means and providing an indication of the variance therebetween.

References Cited

UNITED STATES PATENTS

| 3,067,345 | 12/1962 | Harris | 310—8.7 |
| 3,091,708 | 5/1963 | Harris | 310—8.2 |
| 3,222,919 | 12/1965 | Shoor et al. | 73—17.5 |

FOREIGN PATENTS

| 295,081 | 8/1928 | Great Britain. |
| 784,146 | 10/1957 | Great Britain. |

JAMES J. GILL, *Acting Primary Examiner.*

RICHARD C. QUEISSER, *Examiner.*

J. FISCHER, C. I. McCLELLAND, *Assistant Examiners.*